United States Patent [19]
Whetten et al.

[11] Patent Number: 5,811,494
[45] Date of Patent: *Sep. 22, 1998

[54] IMPACT MODIFIED THINWALL POLYMER COMPOSITIONS

[75] Inventors: Alan R. Whetten; Stephanie C. Cirihal; Stephen M. Hoenig, all of Lake Jackson; Ronald P. Markovich, Houston, all of Tex.

[73] Assignee: The Dow Chemical Company, Midland, Mich.

[ * ] Notice: This patent issued on a continued prosecution application filed under 37 CFR 1.53(d), and is subject to the twenty year patent term provisions of 35 U.S.C. 154(a)(2).

[ * ] Notice: The term of this patent shall not extend beyond the expiration date of Pat. No. 5,804,660.

[21] Appl. No.: 417,626

[22] Filed: Apr. 6, 1995

[51] Int. Cl.$^6$ ............................. C08L 23/08; C08L 23/14; C08L 23/18
[52] U.S. Cl. ............................................. 525/240; 525/191
[58] Field of Search ..................................... 525/239, 240, 525/191

[56] References Cited

U.S. PATENT DOCUMENTS

| | | | |
|---|---|---|---|
| 4,390,573 | 6/1983 | Bullard et al. | 428/35 |
| 4,786,688 | 11/1988 | Thiersault et al. | 525/240 |
| 4,820,557 | 4/1989 | Warren | 428/34.9 |
| 5,082,902 | 1/1992 | Gurevitch et al. | 525/240 |
| 5,145,728 | 9/1992 | Itaba et al. | 428/213 |
| 5,272,236 | 12/1993 | Lai et al. | 526/348.5 |
| 5,278,272 | 1/1994 | Lai et al. | 526/348.5 |
| 5,576,374 | 11/1996 | Betso et al. | 524/451 |

OTHER PUBLICATIONS

Encyclopedia of Polymer Science and Engineering, second edition, pp. 383, 385–386 and 454, Dec. 1986.

*Primary Examiner*—Fred Zitomer

[57] ABSTRACT

Modified polymer compositions having good flowability, impact performance and modulus made from at least polyolefin (e.g., high density polyethylene or polypropylene) blended with minor amounts of either at least one homogeneous linear ethylene/$C_5$–$C_{20}$ α-olefin or at least one substantially linear ethylene/$C_3$–$C_{20}$ α-olefin polymer are disclosed. The compositions are suitable for thermoformed or molded thinwall applications such as drinking cups, lids, and food containers where the flow length to wall thickness ratios are greater than about 180:1.

14 Claims, 2 Drawing Sheets

- ◆ Comparative Blends Runs
- ⊙ Inventive Examples
- ▫ Comparative Runs

- ◆ Comparative Blends Runs
- ⊙ Inventive Examples
- ▫ Comparative Runs

IMPACT MODIFIED THINWALL POLYMER COMPOSITIONS

CROSS-REFERENCE TO RELATED APPLICATIONS

This application is related to application Ser. No. 08/045,330, filed Apr. 8, 1993; pending application Ser. No. 07/945,034, filed Sep. 15, 1992; pending application Ser. No. 08/397,280, filed Mar. 13, 1995; pending application Ser. No. 08/194,236, filed Feb. 10, 1994; U.S. Pat. No. 5,272,236, application Ser. No. 07/776,130, filed Oct. 15, 1991; and U.S. Pat. No. 5,278,272, application Ser. No. 07/939,281, filed Sep. 2, 1992.

FIELD OF THE INVENTION

This invention relates to polymer blend compositions having high flowability, improved impact properties and good modulus retention. The invention particularly relates to polyolefin blend compositions comprising high density polyethylene (HDPE) or polypropylene blended with minor amounts of at least one linear or substantially linear ethylene/α-olefin interpolymer wherein such compositions are useful in thinwall thermoforming and molding applications.

BACKGROUND OF THE INVENTION

For successful use in thermoforming and molding applications polymer compositions must possess a good balance of a number of important properties. One important property requirement for such use is good rheological characteristics such as processability and/or high flowability. As part and mold designs become more intricate and detailed such as, for example, where embossed-type printing or patterns are desired on the face of finished parts, even better flow properties are required to completely fill the mold, avoid short-shots and thereby fabricate high quality parts. Good processability is required to prevent melt fracture and/or insure finished parts have smooth, defect-free surfaces. Furthermore, in contrast to the flow properties required for intricate mold design having relatively low flow length to wall thickness (L/T) ratio (e.g., about 100:1), for thinwall applications, which pertains to downgauged parts and goods having L/T ratios greater than 180:1, high flowability is particularly critical. Injection molded promotional cups provided as give-a-ways at fast-food restaurants is an common example of a thinwall application requiring exceptional polymer composition rheological characteristics well beyond those ordinarily required for conventional molding applications.

Good impact performance is another important polymer composition property required to insure successful use in thermoforming and molding applications. Thermoformed and molded goods intended, for example, for durable and storage use must have a level of impact and abuse resistance that insures long service life and repeated use. For thermoformed and molded containers used, for example, for refrigerated foodstuffs, good low temperature impact performance is also an important polymer composition requirement.

Good topload strength which pertains to high modulus, dimensional stability and compressive strength is still another important property requirement. Good topload strength permits thermoformed and molded goods to be conveniently stacked upon one another without having the goods deform or the stack itself become unstable. Good topload load strength also prevents containers from bulging or becoming unstable when filled with dense items or liquids such as, for example, a tall (e.g., 16-ounce) drinking cup filled to the brim with a beverage or an one-gallon tub filled with ice cream.

Good melt strength is another important property particular to thermoforming. As such, successful thinwall thermoforming requires polymer compositions that have good flowability and good melt strength.

In meeting the various property demands for successful thinwall thermoforming and molding, flow, melt strength, impact and topload properties must be carefully balanced. Structural polymer composition properties (such as, for example, density, branching and molecular weight) which directly affect one of the important properties can inversely and/or adversely affect one or more other properties. For example, it is well known that polyolefin compositions characterized as having lower densities have improved impact resistance relative to other polyolefin compositions having higher densities. Conversely, a polyolefin composition having a higher density invariably has a higher modulus relative to a lower density polyolefin composition. As such, good impact resistance and high modulus (good topload strength) are generally considered to be mutually exclusive polyolefin polymer properties. As another mutually exclusive relationship pertaining to impact resistance, it is also known that polyolefin compositions having higher molecular weights generally have improved impact and abuse properties, however such compositions also generally have inferior flow properties relative to polyolefin compositions having lower molecular weights.

High flowability and good melt strength is another relationship which is generally considered to be mutually exclusive. Whereas low molecular weights are generally required for high flowability, conversely, high molecular weights are generally required for good melt strength.

Although various polymer compositions are used in thinwall applications, a need presently exists for high flow or high melt strength compositions which exhibit substantially improved impact properties while retaining good topload strengths. In particular, there is a need for a polyolefin component polymer which at minor addition amounts effectively and substantially impact modifies high flow polyolefins also characterized as having good topload strength.

SUMMARY OF THE INVENTION

Modified compositions useful in thinwall thermoforming and molding applications have now been discovered to have a good balance of high flowability, good impact performance and good modulus retention. The compositions useful for thinwall thermoforming and molding comprise A) at least one polyolefin selected from the group consisting of polypropylene, high density polyethylene, medium density polyethylene, and linear low density polyethylene, wherein the ethylene polymers of the group are characterized as having i. a processing index of less than or equal to about 1.0, and ii. an $I_{10}/I_2$ of at least 7.0, and B) a minor amount, based on the total weight of the composition, of at least one linear or substantially linear ethylene/α-olefin polymer wherein both the linear and substantially linear ethylene/α-olefin polymers are ethylene/α-olefin interpolymers having i. a short chain branching distribution index (SCBDI) greater than about 30 percent, and ii. a single melting point as determined using differential scanning calorimetry (DSC)), and wherein the substantially linear ethylene/α-olefin polymer is further characterized as having iii. a melt flow ratio, $I_{10}/I_2$, $\geq 5.63$, iv. a molecular weight distribution, $M_w/M_n$, defined by the equation:

$$M_w/M_n \leq (I_{10}/I_2) - 4.63,$$

and v. a critical shear rate at onset of surface melt fracture of at least 50 percent greater than the critical shear rate at the onset of surface melt fracture of a linear olefin polymer having essentially the same $I_2$ and $M_w/M_n$, i.e., the measured $I_2$ and $M_w/M_n$ values are within 10 percent of each other for the two polymers.

The substantially linear ethylene/α-olefin polymer can also be further characterized as having:

iii. a melt flow ratio, $I_{10}/I_2$, $\geq 5.63$, iv. a molecular weight distribution, $M_w/M_n$, defined by the equation:

$$M_w/M_n \leq (I_{10}/I_2) - 4.63, \text{ and}$$

v. a processing index (PI) less than or equal to about 70 percent of the PI of a linear olefin polymer having essentially the same $I_2$ and $M_w/M_n$.

DETAILED DESCRIPTION OF THE INVENTION

Figure 1:
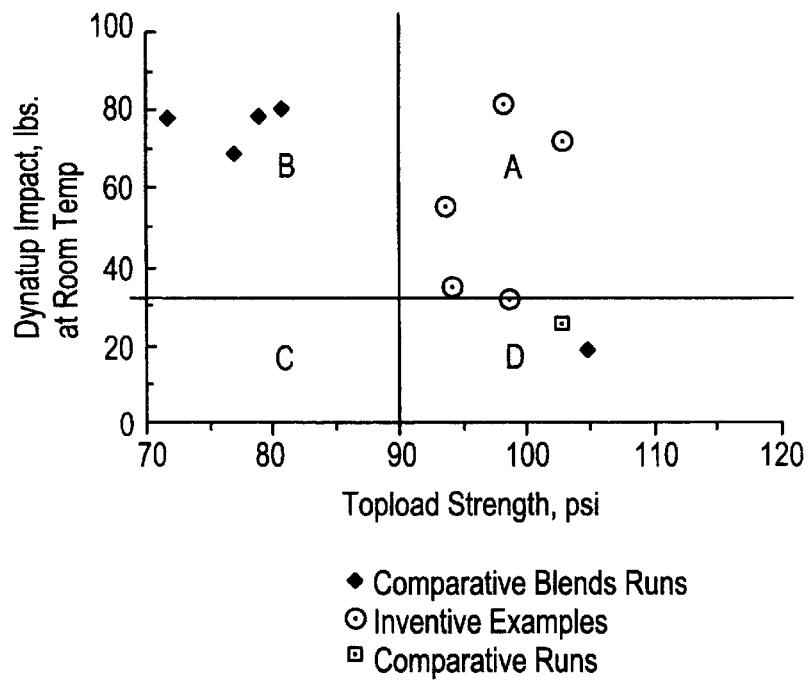
FIG. 1 describes the relationship between Topload Strength and 23° C. (70° F.) Dynatup Impact Strength from Examples 5, 8, 9, 11 and 13 and from Comparative Runs 3, 7, 10, 12, 14 and 16 as well as defined limits of topload strength losses and level of required impact improvement.

The novel modified composition is a high flow or high melt strength polymer composition which provides thermoformed or molded goods and parts having a Dynatup Impact Energy value at 23° C. (75° F.) at least about 25 percent, preferably at least about 30 percent, more preferably at least about 50 percent higher than the at least one polyolefin Component (A) and a topload strength retention value which is at least about 85 percent, preferably at least about 90 percent, more preferably at least about 95 percent of the at least one polyolefin Component (A). The modified compositions are suitable for thermoformed and molded thinwall applications where the flow length to wall thickness ratio of the thermoformed or molded good is at least about 180:1, preferred compositions are suitable at L/T ratios of at least about 250:1 and most preferred compositions are suitable at L/T ratios of at least about 300:1.

The term "topload retention retention value" as used herein refers to a percentage of topload strength reduction for a composition using the same Component (A) polyolefin employed in the composition as the basis for the calculation. For example, where a HDPE polymer measures a topload strength of 100 psi and modified composition comprising the HDPE measures a topload strength of 85 psi, the topload retention value for the modified composition will be expressed as at least about 85 percent.

The term "homogeneous linear ethylene/α-olefin polymers" means that the olefin polymer has a homogeneous short branching distribution but does not have long chain branching. That is, the linear ethylene/α-olefin polymer has an absence of long chain branching. Such polymers include linear low density polyethylene polymers and linear high density polyethylene polymers and can be made using polymerization processes (e.g., as described by Elston in U.S. Pat. No. 3,645,992, the disclosure of which is incorporated herein by reference) which provide uniform branching (i.e., homogeneously branched) distribution. Uniform branching distributions are those in which the comonomer is randomly distributed within a given interpolymer molecule and wherein substantially all of the interpolymer molecules have the same ethylene/comonomer ratio within that interpolymer. In his polymerization process, Elston uses soluble vanadium catalyst systems to make such polymers, however others such as Mitsui Chemical Corporation and Exxon Chemical Company have used so-called single site catalyst systems to make polymers having a similar homogeneous structure.

The term "homogeneous linear ethylene/α-olefin polymers" does not refer to high pressure branched polyethylene which is known to those skilled in the art to have numerous long chain branches. Typically, the homogeneous linear ethylene/α-olefin polymer is an ethylene/α-olefin interpolymer, wherein the α-olefin is at least one $C_5$–$C_{20}$ α-olefin (e.g., 1-pentene, 4-methyl-1-pentene, 1-hexene, 1-octene and the like), preferably wherein at least one of the α-olefins is 1-octene. Most preferably, the ethylene/α-olefin interpolymer is a copolymer of ethylene and a C5–$C_{20}$ α-olefin, especially an ethylene/$C_4$–$C_6$ α-olefin copolymer.

The substantially linear ethylene/α-olefin interpolymers used in the present invention are not in the same class as homogeneous linear ethylene/α-olefin polymers, nor heterogeneous linear ethylene/α-olefin polymers, nor are they in the same class as traditional highly branched low density polyethylene. The substantially linear olefin polymers useful in this invention surprisingly have excellent processability, even though they have relatively narrow molecular weight distributions. Even more surprising, the melt flow ratio ($I_{10}/I_2$) of the substantially linear olefin polymers can be varied essentially independently of the polydispersity index (i.e., molecular weight distribution ($M_w/M_n$)). This is contrasted with conventional heterogeneously branched linear polyethylene resins having rheological properties such that as the polydispersity index increases, the $I_{10}/I_2$ value also increases.

Substantially linear ethylene/α-olefin polymers are homogeneous polymers having long chain branching. The long chain branches have the same comonomer distribution as the polymer backbone and can be as long as about the same length as the length of the polymer backbone. The polymer backbone is substituted with about 0.01 long chain branches/

1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

The substantially linear ethylene/α-olefin interpolymers used in the present invention are herein defined as in U.S. Pat. No. 5,272,236 and in U.S. Pat. No. 5,278,272. The substantially linear ethylene/α-olefin interpolymers useful for impact modifying the polyolefin (e.g., high density polyethylene and polypropylene) are those in which the comonomer is randomly distributed within a given interpolymer molecule and wherein substantially all of the interpolymer molecules have the same ethylene/comonomer ratio within that interpolymer.

Long chain branching can be determined by conventional techniques known in the industry such $^{13}C$ nuclear magnetic resonance (NMR) spectroscopy techniques using, for example, the method of Randall (Rev. Macromol. Chem. Phys., C29 (2&3), p. 285–297), the disclosure of which is incorporated herein by reference. Two other methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., J. Chem. Phys., 17, 1301 (1949) and Rudin, A., *Modern Methods of Polymer Characterization,* John Wiley & Sons, New York (1991) pp. 103–112, both of which are incorporated by reference.

A. Willem degroot and P. Steve Chum, both of The Dow Chemical Company, at the Oct. 4, 1994 conference of the Federation of Analytical Chemistry and Spectroscopy Society (FACSS) in St. Louis, Mo. presented data demonstrating that GPC-DV is a useful technique for quantifying the presence of long chain branches in substantially linear ethylene interpolymers. In particular, degroot and Chum found that the level of long chain branches in substantially linear ethylene homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, degroot and Chum showed that GPC-DV may be used to quantify the level of long chain branches in substantially linear ethylene/octene copolymers.

degroot and Chum also showed that a plot of Log($I_2$ Melt Index) as a function of Log(GPC Weight Average Molecular Weight) as determined by GPC-DV illustrates that the long chain branching aspects (but not the extent of long branching) of substantially linear ethylene polymers are comparable to that of high pressure, highly branched low density polyethylene (LDPE) and are dearly distinct from ethylene polymers produced using Ziegler-type catalysts such as titanium complexes and ordinary homogeneous catalysts such as hafnium and vanadium complexes.

For ethylene/alpha-olefin interpolymers, the long chain branch is longer than the short chain branch that results from the incorporation of the alpha-olefin(s) into the polymer backbone. The empirical effect of the presence of long chain branching in the substantial linear ethylene/alpha-olefin interpolymers used in the invention is manifested as enhanced rheological properties which are quantified and expressed herein in terms of gas extrusion rheometry (GER) results and/or melt flow, $I_{10}/I_2$, increases.

In contrast to the term "substantially linear", the term "linear" means that the polymer lacks measurable or demonstrable long chain branches, i.e., the polymer is substituted with an average of less than 0.01 long branch/1000 carbons.

The substantially linear ethylene/α-olefin interpolymers for use in impact modifying the polyolefin in the present invention are interpolymers of ethylene with at least one $C_3-C_{20}$ α-olefin and/or $C_4-C_{18}$ diolefins. Copolymers of ethylene and 1-octene are especially preferred. The term "interpolymer" is used herein to indicate a copolymer, or a terpolymer, or the like. That is, at least one other comonomer is polymerized with ethylene to make the interpolymer.

Other unsaturated monomers usefully copolymerized with ethylene include, for example, ethylenically unsaturated monomers, conjugated or nonconjugated dienes, polyenes, etc. Preferred comonomers include the $C_3-C_{20}$ α-olefins especially propene, isobutylene, 1-butene, 1-hexene, 4-methyl-1-pentene, and 1-octene. Other preferred monomers include styrene, halo- or alkyl substituted styrenes, tetrafluoroethylene, vinylbenzocyclobutane, 1,4-hexadiene, and naphthenics (e.g., cyclopentene, cyclohexene and cyclooctene).

The density of the linear or substantially linear ethylene/α-olefin interpolymers (as measured in accordance with ASTM D-792) for use in the present invention is no higher than about 0.92 g/cc, generally from about 0.85 g/cc to about 0.91 g/cc, preferably from about 0.86 g/cc to about 0.9 g/cc, and especially from about 0.865 g/cc to about 0.89 g/cc.

Generally, the amount of the homogeneous linear ethylene/α-olefin interpolymer or substantially linear ethylene/α-olefin polymer incorporated into the composition is from about 1 percent to about 25 percent, by weight of the composition, preferably about 2 percent to about 20 percent, by weight of the composition, and especially from about 5 percent to about 15 percent, by weight of the composition.

The molecular weight of the homogeneous linear ethylene/α-olefin interpolymer or substantially linear ethylene/α-olefin polymers for use in the present invention is conveniently indicated using a melt index measurement according to ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. The melt index for the homogeneous linear ethylene/α-olefin interpolymer or substantially linear ethylene/α-olefin polymers useful herein is generally from about 0.01 grams/10 minutes (g/10 min) to about 300 g/10 min, preferably about 15 g/10 min. to about 250 g/10 min. and more preferably from about 30 g/10 min to about 200 g/10 min.

Another measurement useful in characterizing the molecular weight of the homogeneous linear ethylene/α-olefin interpolymer or the substantially linear ethylene/α-olefin polymers is conveniently indicated using a melt index measurement according to ASTM D-1238, Condition 190° C./10 kg (formerly known as "Condition (N)" and also known as $I_{10}$). The ratio of the $I_{10}$ and the $I_2$ melt index terms is the melt flow ratio and is designated as $I_{10}/I_2$. For the substantially linear ethylene/α-olefin polymers used in the compositions of the invention, the $I_{10}/I_2$ ratio indicates the degree of long chain branching, i.e., the higher the $I_{10}/I_2$ ratio, the more long chain branching in the polymer. The $I_{10}/I_2$ ratio of the substantially linear ethylene/α-olefin polymers is at least about 6.5, preferably at least about 7, especially at least about 8. The $I_{10}/I_2$ ratio of the linear ethylene/α-olefin polymers is generally about 6.

Additives such as antioxidants (e.g., hindered phenolics (e.g., Irganox® 1010), phosphites (e.g., Irgafos® 168)), antiblock additives, pigments, fillers, and the like can also be included in the modified formulations, to the extent that they do not interfere with the enhanced formulation properties discovered by Applicants.

The "rheological processing index" (PI) is the apparent viscosity (in kpoise) of a polymer measured by a gas extrusion rheometer (GER). The gas extrusion rheometer is described by M. Shida, R. N. Shroff and L. V. Cancio in Polymer Engineering Science, Vol. 17, no. 11, p. 770 (1977), and in "Rheometers for Molten Plastics" by John Dealy, published by Van Nostrand Reinhold Co. (1982) on page 97–99, both publications of which are incorporated by reference herein in their entirety. All GER experiments are performed at a temperature of 190° C., at nitrogen pressures between 5250 to 500 psig using a 0.0296 inch diameter, 20:1$^L$/D die with an entrance angle of 180°. For the substantially linear ethylene/α-olefin polymers used herein, the PI is the apparent viscosity (in kpoise) of a material measured by GER at an apparent shear stress of 2.15×106 dyne/cm$^2$. The substantially linear ethyleneα-olefin polymers used herein preferably have a PI in the range of about 0.01 kpoise to about 50 kpoise, preferably about 15 kpoise or less. The substantially linear ethylene/α-olefin polymers used herein have a PI less than or equal to about 70 percent of the PI of a linear ethylene/α-olefin polymer at essentially the same $I_2$ and $M_w/M_n$.

An apparent shear stress vs. apparent shear rate plot is used to identify the melt fracture phenomena. According to Ramamurthy in Journal of Rheology, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture (OSMF) is characterized at the beginning of losing extrudate gloss at which the surface roughness of extrudate can only be detected by 40× magnification. The critical shear rate at onset of surface melt fracture for the substantially linear ethylene/α-olefin polymers is at least 50 percent greater than the critical shear rate at the onset of surface melt fracture of a linear ethylene/α-olefin polymer having essentially the same $I_2$ and $M_w/M_n$.

Gross melt fracture occurs at unsteady flow conditions and ranges in detail from regular (alternating rough and smooth, helical, etc.) to random distortions. For commercial acceptability, (e.g., in collapsible water bottles), surface defects should be minimal, if not absent. The critical shear rate at onset of surface melt fracture (OSMF) and onset of gross melt fracture (OGMF) will be used herein based on the changes of surface roughness and configurations of the extrudates extruded by a GER.

Both the linear and substantially linear ethylene/α-olefin polymers useful for forming the compositions described herein have homogeneous branching distributions. That is, the polymers are those in which the comonomer is randomly distributed within a given interpolymer molecule and wherein substantially all of the interpolymer molecules have the same ethylene/comonomer ratio within that interpolymer. The homogeneity of the polymers is typically described by the SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, Journal of Polymer Science, Poly. Phys. Ed., Vol. 20, p. 441 (1982), in U.S. Pat. No. 4,798,081 (Hazlitt et al.), or in U.S. Pat. No. 5,089,321 (Chum et al.) the disclosures of all of which are incorporated herein by reference. The SCBDI or CDBI for the linear and for the substantially linear olefin polymers used in the present invention is preferably greater than about 30 percent, especially greater than about 50 percent. The homogeneous ethylene/α-olefin polymers used in this invention essentially lack a measurable "high density" fraction as measured by the TREF technique (i.e., the homogeneous ethylene/α-olefin polymers do not contain a polymer fraction with a degree of branching less than or equal to 2 methyls/1000 carbons). The homogeneous ethylene/α-olefin polymers also do not contain any highly short chain branched fraction (i.e., the homogeneous ethylene/α-olefin polymers do not contain a polymer fraction with a degree of branching equal to or more than 30 methyls/1000 carbons).

The linear and substantially linear ethylene/α-olefin interpolymer product samples are analyzed by gel permeation chromatography (GPC) on a Waters 150 C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in Journal of Polymer Science, Polymer Letters, Vol. 6, (621) 1968, incorporated herein by reference) to derive the following equation:

$$M polyethylene = a*(M polystyrene)^b.$$

In this equation, a=0.4316 and b=1.0. Weight average molecular weight, Mw, is calculated in the usual manner according to the following formula: Mw=R wi* Mi, where wi and Mi are the weight fraction and molecular weight, respectively, of the ith fraction eluting from the GPC column.

For the linear and substantially linear ethylene/α-olefin polymers, the $M_w/M_n$ is preferably from about 1.5 to about 2.5.

The substantially linear ethylene/α-olefin interpolymers used in the present invention are made by using techniques, methods, catalysts and/or co-catalyst described in pending application Ser. Nos. 08/045,330, 08/397,280 and 07/945,034 and in U.S. Pat. Nos. 5,272,236 and 5,278,272.

The polymerization conditions for manufacturing the substantially linear ethylene/α-olefin polymers used in the present invention are generally those useful in the solution polymerization process, although the application of the present invention is not limited thereto. Slurry and gas phase polymerization processes are also believed to be useful, provided the proper catalysts and polymerization conditions are employed.

Multiple reactor polymerization processes can also be used in making the homogeneous linear ethylene/α-olefin interpolymer or substantially linear ethylene/α-olefin interpolymers used in the present invention, such as those disclosed in U.S. Pat. No. 3,914,342, incorporated herein by reference. The multiple reactors can be operated in series or in parallel, with at least one homogeneous catalyst employed in one of the reactors.

The Polyolefins Which Are Impact Modified (Component A)

Polyolefins which are beneficially impact modified by the addition of the homogeneous linear ethylene/α-olefin interpolymers or substantially linear ethylene/α-olefin interpolymers discussed herein are characterized as high flow or high melt strength compositions suitable for thinwall thermoforming and molding applications. Suitable polyolefins generally have a processing index (PI) of less than about 1.0, preferably less than or equal to about 0.6, more preferably less than or equal to about 0.4 and most preferably less than or equal to about 0.3. Suitable polyolefins include high density polyethylene (HDPE), polypropylene, medium density polyethylene (MDPE), linear low density polyethylene (LLDPE) and ethylene carbon monoxide copolymers (ECO), ethylene/propylene carbon monoxide polymers (EPCO), linear alternating ECO copolymers such as those disclosed by Hefner an Brian W. S. Kolthammer, entitled "Improved Catalysts For The Preparation of Linear Carbon Monoxide/Alpha Olefin Copolymers," the disclosure of which is incorporated herein by reference, and recycled polyethylene (e.g., post consumer recycled high density polyethylene recovered from waste bottles). Generally, at least one high density polyethylene (HDPE) is preferred in molding applications and polypropylene is preferred in thermoforming applications.

The HDPE, MDPE and LLDPE polymers suitable for use as Component (A) are known classes of compounds which can be produced by any well-known solution or particle-form polymerization process, such as slurry polymerization and gas phase polymerization. Preferably, the HDPE, MDPE and LLDPE are produced using well-known Phillips or Ziegler type coordination catalysts in a solution process, although metallocene catalyst systems can also be used.

Component (A) can also be a blend of polyolefins or a blend of at least one polyolefin with other thermoplastic. Such blends can be prepared in-situ (e.g., by having a mixture of catalysts in a single polymerization reactor or by using different catalysts in separate reactors connected in parallel or in series) or by physical blending of polymers such as by known melt or dry-blending techniques. Additionally, where Component (A) is an ethylene polymer homopolymer or an ethylene/α-olefin interpolymer, the modified composition of the present invention itself can be manufactured in-situ using multiple reactors in series or parallel configuration with the same or different catalysts in each reactor. A technique for making the novel modified composition is disclosed in pending U.S. Pat. No. 08/010, 958, entitled Ethylene Interpolymerizations, which was filed Jan. 29, 1993, the disclosure of which is incorporated herein in its entirety by reference. U.S. Pat. No. 08/010,958 describes, inter alia, interpolymerizations of ethylene and $C_3$–$C_{20}$ α-olefins using a homogeneous catalys in at least one reactor and a heterogeneous catalyst in at least one other reactor. The reactors can be operated sequentially or in parallel.

The high density polyethylene (HDPE) can be an ethylene homopolymer or an interpolymer of ethylene with at least one α-olefin of from 3 to 20 carbon atoms such as 1-propylene, 1-butene, 1-isobutylene, 4-methyl-1-pentene, 1-hexene, 1-heptene and 1-octene. When HDPE is an interpolymer, preferably, it is a copolymer of ethylene and 1-octene. However, most preferably, the high density polyethylene is an ethylene homopolymer.

Suitable LLDPE and MDPE polymers are ethylene/α-olefin interpolymers with at least one α-olefin of from 3 to 20 carbon atoms such as 1-propylene, 1-butene, 1-isobutylene, 4-methyl-l-pentene, 1-hexene, 1-heptene and 1-octene. When LLDPE or MDPE are employed as Component (A), preferably they are copolymers of ethylene and 1-octene.

The density of suitable HDPE, MDPE and LLDPE polymers (as measured in accordance with ASTM D-792) generally range from about 0.92 g/cc to about 0.96 g/cc, preferably from about 0.935 g/cc to about 0.958 g/cc and more preferably from about 0.942 g/cc to about 0.955 g/cc.

Generally, the $I_2$ melt index of suitable HDPE, MDPE and LLDPE polymers (as measured according to ASTM D-1238, Condition 190° C./2.16 kg, formerly known as "Condition (E)") is in the range of from about 0.1 g/10 min. to about 300 g/10 min. For thermoforming applications, the $I_2$ melt index is in the range of from about 0.1 to about 35 g/10 min., preferably from about 0.5 to about 25 g/10 min., and more preferably from about 1 g/10 min. to about 20 g/10 min. For molding applications, the 12 melt index is in the range of from about 20 g/10 minutes to about 300 g/10, preferably from about 30 g/10 minutes to about 150 g/10 minutes and, more preferably, from about 40 g/10 minutes to about 100 g/10 minutes.

The $I_{10}/I_2$ of suitable HDPE, MDPE and LLDPE polymers (where the $I_{10}$ value is determined according to ASTM D-1238, Condition 190° C./10 kg, formerly known as "Condition (N)") is generally at least about 7.0, preferably at least about 7.5 and more preferably at least about 8.0. The molecular weight distribution (as determined by the method described herein for linear and substantially linear ethylene/α-olefin interpolymers) of suitable HDPE, MDPE and LLDPE polymers is preferably at least about 3, more preferably at least about 3.2 and most preferably at least about 3.5. Additionally, to avoid excessive brittleness, suitable HDPE, MDPE and LLDPE polymer will not have a bimodal molecular weight distribution.

The novel modified composition comprises from about 75 to about 99 weight percent, preferably from about 80 to about 98 weight percent, and more preferably from about 85 to about 95 weight percent, based on the total weight of the composition, of Component (A).

The polypropylene is generally in the isotactic form of homopolymer polypropylene, although other forms of polypropylene can also be used (e.g., syndiotactic or atactic). Polypropylene impact copolymers (e.g., those wherein a secondary copolymerization step reacting ethylene with the propylene is employed) and random copolymers (also reactor modified and usually containing 1.5–7 percent ethylene copolymerized with the propylene), however, can also be used in the modified compositions disclosed herein. A complete discussion of various polypropylene polymers is contained in Modern Plastics Encyclopedia/89, mid October 1988 Issue, Volume 65, Number 11, pp. 86–92, the entire disclosure of which is incorporated herein by reference. The molecular weight of the polypropylene for use in the present invention is conveniently indicated using a melt flow measurement according to ASTM D-1238, Condition 230° C./2.16 kg (formerly known as "Condition (L)" and also known as $I_2$). Melt flow rate is inversely proportional to the molecular weight of the polymer. Thus, the higher the molecular weight, the lower the melt flow rate, although the relationship is not linear. The melt flow rate for the polypropylene useful herein is generally less than about 300 g/10 min. For thinwall thermoforming applications, the melt flow rate for the polypropylene is generally from about 0.1 g/10 min to about 35 g/10 min, preferably from about 0.5 g/10 min to about 25 g/10 min, and especially from about 1 g/10 min to about 20 g/10 min. For thinwall molding applications the melt flow rate for the polypropylene is generally from about 20 g/10 min to about 100 g/10 min.

The formulations are compounded by any convenient method, including dry blending the individual components and subsequently melt mixing, either directly in the extruder used to make the finished article (e.g., a deli container), or by pre-melt mixing in a separate extruder (e.g., a Banbury mixer, a Haake mixer, a Brabender internal mixer, or a twin screw extruder).

There are many types of molding operations which can be used to form useful fabricated articles or parts from the modified compositions disclosed herein, including various injection molding processes (e.g., those described in Modern Plastics Encyclopedia/89, Mid October 1988 Issue, Volume 65, Number 11, pp. 264–268, "Introduction to Injection Molding" and on pp. 217–218, "Injection Molding Thermoplastics", the disclosures of which are incorporated herein by reference) and blow molding processes (e.g., that described in Modern Plastics Encydopedia/89, Mid October 1988 Issue, Volume 65, Number 11, pp. 217–218, "Extrusion-Blow Molding", the disclosure of which is incorporated herein by reference) and profile extrusion. Some of the fabricated articles include drinking cups, ice cream tubs, deli containers and lids, as well as other household and personal articles, including, for example, toys.

Tensile properties of fabricated thinwall parts and goods are measured according to ASTM D-638. Flexural and tangent modulus for fabricated thinwall parts and goods is measured according ASTM D-790. Dynatup energy impact strength for fabricated thinwall parts and goods is determined in accordance with ASTM D-3763. Bruceton stair method 0° C. impact resistance for fabricated thinwall parts and goods is determined according to ASTM D-2463.

Frozen free-drop impact resistance for fabricated thinwall parts and goods is determined by filling five 12-ounce deli containers (fabricated from same polymer composition) to the brim with water and freezing the water/container for 24 hours in a ordinary household refrigerator. After freezing for 24 hours, the five containers are dropped individually from a starting height of a ½ foot and dropped at incrementally ½ foot higher heights until rupture. If a container does not rupture at one ½ foot increment after one drop, the same container is then dropped from a height a ½ foot higher and so on until the container ruptures. Once one container ruptures, the another container is then drop tested until all five containers have been ruptured. The resistance to frozen impact is reported as the average rupture height of the five replications.

Topload strength for fabricated thinwall parts and goods is determined using an Instron tensiometer with the bottom jaw stationary and applying compressive stress until the the part or goods shows any indication or yielding or deformation. The topload strength is determined in quadruplicate and average to provide the values reported in Examples.

The following examples illustrate some of the particular embodiments of the present invention, but the following should not be construed to mean the invention is limited to the particular embodiments shown.

EXAMPLES

Example 1

In an evaluation to determine impact improvement and retention of topload strength, a high flow isotatic polypropylene homopolymer having a density of about 0.90 g/cc and a 2.2 MFR and supplied commercially by Amoco Polymers under the designation PP 50-6219 was thoroughly dry blended with 5 percent (by weight of the total blend) of a substantially linear ethylene/1-octene copolymer made by a solution polymerization process using a constrained geometry catalyst and having a density of about 0.8965 g/cc and a $I_2$ melt index of about 0.90 g/10 min. The blend composition is fabricated into 12-ounce deli containers having a 380:1 L/T and an 11-mil sidewall thickness using a OMV horizontal thermoformer fitted with 12 forming cavities. The containers were free of surface defects, the frozen free-drop impact resistance of the containers was 1.9 ft and the topload strength of the containers was 45 lbs.

Comparative Run 2

The same evaluation as conducted for Example 1 is repeated except the isotactic polypropylene homopolymer is not dry-blend any other polymer. The containers were free of surface defects, the frozen free-drop impact resistance of the containers was 1.3 ft and the topload strength of the containers was 48 lbs.

From these evaluations it can be seen that the addition of a minor amount of the substantially ethylene/1-octene copolymer substantially improves the low temperature impact resistance of the polypropylene (i.e., the improvement is about 46 percent) while maintaining a good topload strength (i.e., the topload strength retention value is about 94 percent).

Examples 4, 5, 8, 9, 11, 13 and 15 and Comparative Runs 3, 6, 7, 10, 14 and 16

In another evaluation, a high flow high density polyethylene copolymer of ethylene and 1-octene is made by a solution polymerization process using Ziegler type catalysts and two reactors in series. The reactor split is such that about 15 weight percent of the copolymer is made in the first reactor as a very broad molecular weight distribution polymer fraction. The reactors are controlled to provide the following properties: an $I_2$ melt index of about 78.6 g/10 min., a density of about 0.942 g/cc, a monomodal molecular weight distribution of about 3.3 and an $I_{10}/I_2$ of about 8.5. The high density polyethylene copolymer is dry blended with four different substantially linear ethylene/1-octene copolymers made by a solution polymerization process using a constrained geometry catalyst. These blends as well as the HDPE without any modifier added (Comparative Run 3) are fabricated on a Husky XL22P injection molder equipped with a four-cavity mold at a 510° F. barrel temperature and a 60° F. mold temperature into 28-ounce deli cups having a 225:1 L/T ratio and a 26-mil wall thickness. The properties of the fabricated deli cups are shown in Table 1.

TABLE 1

| Sample | HDPE[a] wt. % | Substantially Linear Polymer wt. % | Melt Index $I_2$, g/10 min | Density g/cc | Dynatup Impact lbs. | Topload Strength lbs. |
|---|---|---|---|---|---|---|
| Compar. Run 3 | 100 | 0 | 78.6 | 0.942 | 26 | 102.8 |
| Ex. 4 | 95 | 5[b] | 77.6 | 0.9394 | 87.65 | ND |
| Ex. 5 | 90 | 10[b] | 74.1 | 0.9364 | 81.77 | 98.03 |
| Comp. Run 6 | 85 | 15[b] | ND | ND | ND | 77.54 |
| Comp. Run 7 | 75 | 25[b] | 63.1 | 0.930 | 77.76 | 71.64 |
| Ex. 8 | 95 | 5[c] | 70.3 | 0.938 | 34.64 | 94.16 |
| Ex. 9 | 90 | 10[c] | 72.8 | 0.938 | 55.34 | 93.54 |
| Comp. Run 10 | 75 | 25[c] | 60.5 | .0934 | 68.96 | 76.93 |
| Ex. 11 | 95 | 5[d] | 63.0 | 0.938 | 72.52 | 102.8 |
| Comp. Run 12 | 80 | 20[d] | 32.0 | 0.931 | 80.19 | 80.7 |
| Ex. 13 | 95 | 5[e] | 69.4 | 0.938 | 31.7 | 98.74 |
| Comp. Run 14 | 90 | 10[e] | 76.3 | 0.938 | 19.33 | 104.9 |
| Ex. 15 | 85 | 15[e] | ND | ND | ND | 85.34 |
| Comp. Run. 16 | 75 | 25[e] | 49.8 | 0.934 | 78.13 | 78.84 |

[a]The HDPE is a high flow ethylene/1-octene copolymer made in a solution polymerization process using Ziegler-type catalyst and two reactors operated in series.
[b]The substantially linear ethylene polymer is a copolymer of ethylene and 1-octene made by a solution polymerization process using a constrained geometry catalyst system and havings about a 30 g/10 min. $I_2$ melt index and about a 0.885 g/cc density.
[c]The substantially linear ethylene polymer is a copolymer of ethylene and 1-octene made by a solution polymerization process using a constrained geometry catalyst system and having about a 30 g/10 min. $I_2$ melt index and a about 0.913 g/cc density.
[d]The substantially linear ethylene polymer is a copolymer of ethylene and 1-octene made by a solution polymerization process using a constrained geometry catalyst system and having about a 1 g/10 min. $I_2$ melt index and a about 0.885 g/cc density.
[e]The substantially linear ethylene polymer is a copolymer of ethylene and 1-octene made by a solution polymerization process using a constrained geometry catalyst system and having about a 30 g/10 min. $I_2$ melt index and a about 0.902 g/cc density.
ND = not determined.

FIG. 1 shows that Examples 4, 5, 8, 9, 11, 13 and 15 all show at least about 25 percent higher impact resistance than the based high density polyethylene copolymer while retaining at least about 85 percent of topload strength of the HDPE copolymer. Conversely, FIG. 1 shows that Comparative Runs 6, 7, 10 and 16 all impart improved impact resistance by adversely affecting topload strength. Comparative Run 14 actually improved topload strength, however, impact resistance deteriorated.

Examples 18, 19, 21, 22, 24, 26 and 27 and Comparative Runs 17, 20, 23 and 25

Figure 2:
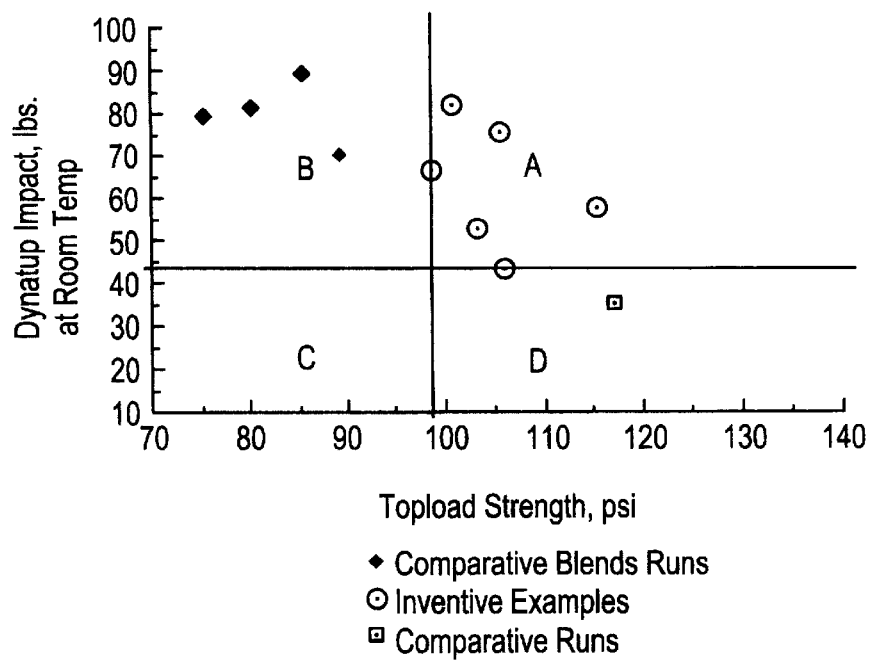
FIG. 2 describes the relationship between Topload Strength and 23° C. (70° F.) Dynatup Impact Strength from Examples 18, 19, 21, 22, 24, 26 and 27 and from Comparative Runs 17, 20, 23 and 25 as well as defined limits of topload strength losses and level of required impact improvement.

In another evaluation, another high flow high density polyethylene copolymer of ethylene and 1-octene is made by a solution polymerization process using Ziegler type catalysts and two reactors in series. The reactor split is such that about 15 weight percent of the copolymer is made in the first reactor as a very broad molecular weight distribution polymer fraction. The reactors are controlled to provide the following properties: an $I_2$ melt index of about 54.4 g/10 min., a density of about 0.941 g/cc, a monomodal molecular weight distribution of about 3.2 and an $I_{10}/I_2$ of about 8.5. The high density polyethylene copolymer is dry blended with four different substantially linear ethylene/1-octene copolymers made by a solution polymerization process using a constrained geometry catalyst. These blends as well as the HDPE without any modifier added (Comparative Run 17) are fabricated on a Husky XL22P injection molder equipped with a four-cavity mold at a 510° F. barrel temperature and a 60° F. mold temperature into 28-ounce deli cups having a 225:1 L/T ratio and a 26mil wall thickness. The properties of the fabricated deli cups are shown in Table 2. The relationships between impact performance and topload retention for these Examples and Comparative Runs are shown in FIG. 2.

TABLE 2

| Sample | HDPE[a] wt. % | Substantially Linear Polymer wt. % | Melt Index $I_2$, g/10 min | Density g/cc | Dynatup Impact lbs. | Topload Strength lbs. |
|---|---|---|---|---|---|---|
| Compar. Run 17 | 100 | 0 | 54.4 | 0.941 | 35.03 | 117.2 |
| Ex. 18 | 95 | 5[b] | 52.9 | 0.940 | 43.33 | 105.9 |
| Ex. 19 | 90 | 10[b] | 54.7 | 0.937 | 82.05 | 100.8 |
| Comp. Run 20 | 75 | 25[b] | 48.0 | 0.931 | 79.36 | 75.14 |
| Ex. 21 | 95 | 5[c] | 46.9 | 0.939 | 52.71 | 103.4 |

TABLE 2-continued

| Sample | HDPE[a] wt. % | Substantially Linear Polymer wt. % | Melt Index $I_2$, g/10 min | Density g/cc | Dynatup Impact lbs. | Topload Strength lbs. |
|---|---|---|---|---|---|---|
| Ex. 22 | 90 | 10[c] | 53.0 | 0.936 | 69.78 | 89.22 |
| Comp. Run 23 | 75 | 25[c] | 42.8 | .0933 | 81.35 | 80.11 |
| Ex. 24 | 95 | 5[d] | 39.2 | 0.938 | 75.55 | 105.8 |
| Comp. Run 25 | 80 | 20[d] | 21.2 | 0.931 | 89.51 | 85.56 |
| Ex. 26 | 95 | 5[e] | 52.56 | 0.939 | 57.51 | 115.5 |
| Ex. 27 | 90 | 10[e] | 51.86 | 0.937 | 66.53 | 98.57 |

[a] The HDPE is a high flow ethylene/1-octene copolymer made in a solution polymerization process using Ziegler-type catalyst and two reactors operated in series.
[b] The substantially linear ethylene polymer is a copolymer of ethylene and 1-octene made by a solution polymerization process using a constrained geometry catalyst system and havings about a 30 g/10 min. $I_2$ melt index and about a 0.885 g/cc density.
[c] The substantially linear ethylene polymer is a copolymer of ethylene and 1-octene made by a solution polymerization process using a constrained geometry catalyst system and having about a 30 g/10 min. $I_2$ melt index and a about 0.913 g/cc density.
[d] The substantially linear ethylene polymer is a copolymer of ethylene and 1-octene made by a solution polymerization process using a constrained geometry catalyst system and having about a 1 g/10 min. $I_2$ melt index and a about 0.885 g/cc density.
[e] The substantially linear ethylene polymer is a copolymer of ethylene and 1-octene made by a solution polymerization process using a constrained geometry catalyst system and having about a 30 g/10 min. $I_2$ melt index and a about 0.902 g/cc density.
ND = not determined.

In another evaluation, the same high flow high density polyethylene copolymer used as Comparative Run 3 is dry blended with a substantially linear ethylene/1-octene copolymers made by a solution polymerization process using a constrained geometry catalyst at three different weight percent levels. The HDPE copolymer is also dry blended with a heterogeneously branched ultra low density linear ethylene/1-octene copolymer made by a solution polymerization process using Ziegler-type catalyst. These blends as well as the HDPE without any modifier added (Comparative Run 28) are fabricated on a Husky XL22P injection molder equipped with a four-cavity mold at a 490° F. barrel temperature and a 60° F. mold temperature into 28-ounce containers having a 185:1 L/T ratio and a 36-mil wall thickness. The properties of the fabricated containers are shown in Table 3.

TABLE 3

| Sample | HDPE[a] wt. % | Modifier wt. % | Part Density, g/cc | Polymer or Composition Density g/cc | Dynatup Impact lbs. | Tan Modulus psi |
|---|---|---|---|---|---|---|
| Compar. Run 28 | 100 | 0 | 0.950 | 0.942 | 50 | 197 |
| Ex. 29 | 95 | 5[b] | 0.940 | 0.948 | 75 | 190 |
| Ex. 30 | 90 | 10[b] | 0.940 | 0.946 | 80 | 184 |
| Ex. 31 | 85 | 15[b] | 0.936 | 0.943 | 90 | 174 |
| Comp. Run 32 | 85 | 15[c] | 0.937 | 0.944 | 73 | 152 |

[a] The HDPE is a high flow ethylene/1-octene copolymer made in a solution polymerization process using Ziegler-type catalyst and two reactors operated in series.
[b] The substantially linear ethylene polymer is a copolymer of ethylene and 1-octene made by a solution polymerization process using a constrained geometry catalyst system and havings about a 30 g/10 min. $I_2$ melt index, about a 0.902 g/cc density and about a 7 $I_{10}/I_2$.
[c] The heterogeneously branched ultra low density linear ethylene/1-octene (ULDPE) copolymer made by a solution polymerization process using a Ziegler-type catalyst system and having about a 6 g/10 min. $I_2$ melt index, about a 0.911 g/cc density and about a 8 $I_{10}/I_2$.

Table 3 shows that although the UDLPE copolymer significantly improved impact performance (Comparative Run 32), at a 15 weight percent addition amount, its modulus retention value was undesirably low at 77 percent. Conversely, Table 3 shows the substantially linear ethylene interpolymer provides more efficient impact modification without significant modulus losses (i.e., modulus losses are less than 15 percent for Examples 29–31 and percent improvements relative to Comparative Run 32 are higher).

Figure 3:
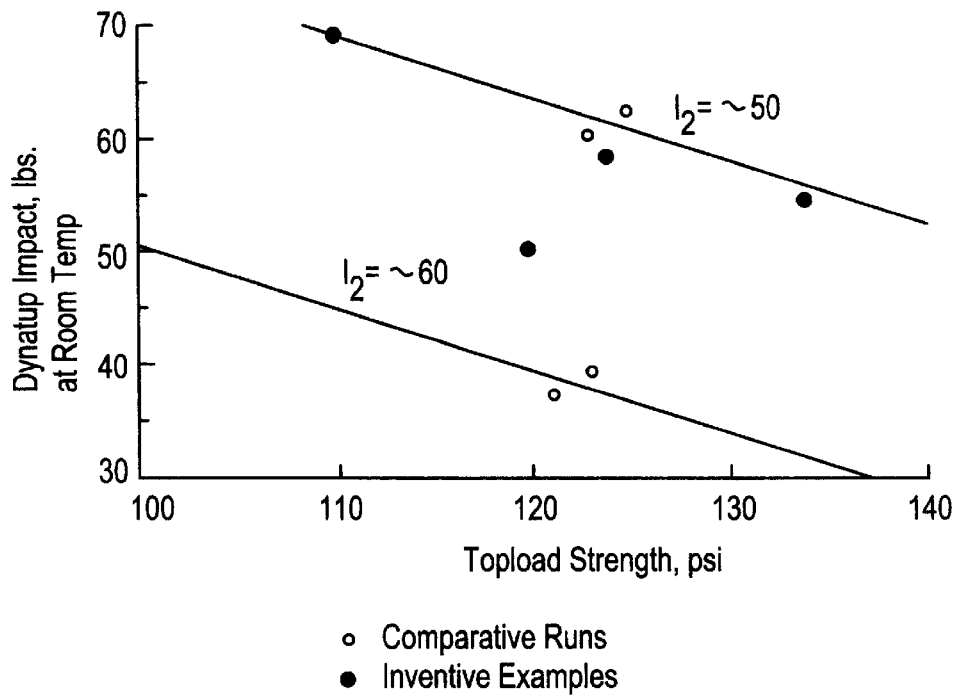
FIG. 3 describes the relationship between Topload Strength and 23° C. (70° F.) Dynatup Impact Strength from Examples 34, 35, 36 and 37 and from Comparative Runs 33a, 33b, 38 and 39 as well as the influence of melt index on the relationship.
Figure 4:
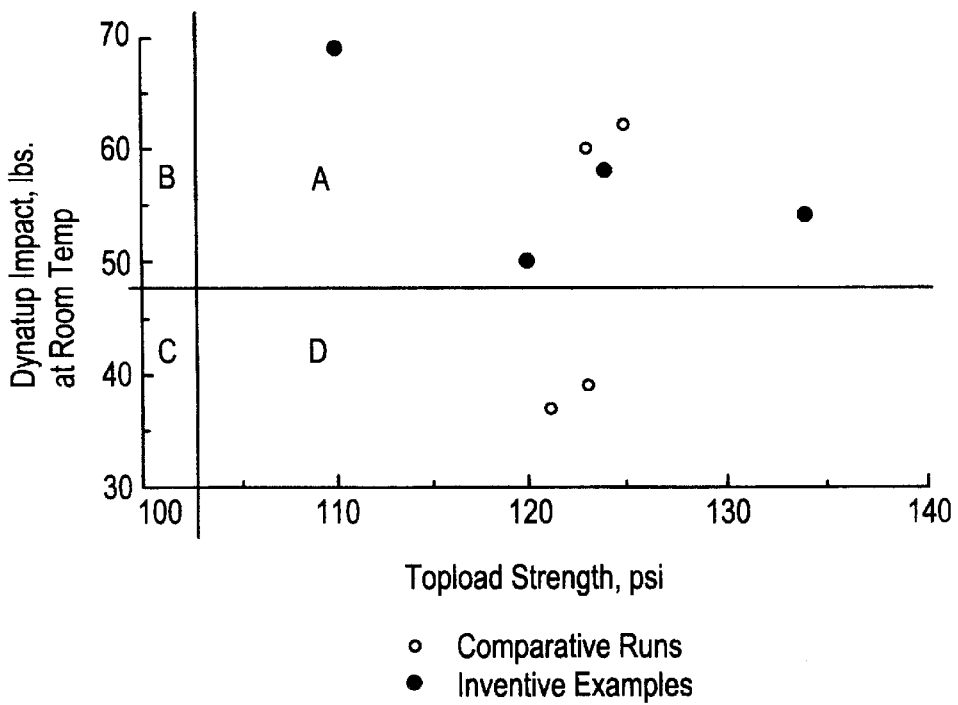
FIG. 4 describes the relationship between Topload Strength and 23° C. (70° F.) Dynatup Impact Strength from Examples 34, 35, 36 and 37 and from Comparative Runs 33a, 33b, 38 and 39 as well as defined limits of topload strength losses and level of required impact improvement.

In another evaluation, containers were made from reactor produced polymer mixtures, a dry blended polymer mixture, a melt compounded polymer mixture, three unmodified (control) high flow injection molding resins supplied commercially by The Dow Chemical Company under the designation IP-40 and IP-60, and an unmodified (control) high density polyethylene resin supplied commercially by The Dow Chemical Company under the designation HDPE 65053. Table 4 shows data for the resins and the fabricated containers. FIG. 3 describes the relationships between Topload Strength and 23° C. (70° F.) Dynatup Impact Strength for the various containers as well as the influence of melt index on the relationships. FIG. 4 describes the relationships between Topload Strength and 23° C. (70° F.) Dynatup Impact Strength for the various containers as well as defined limits of topload strength losses and level of required impact improvement.

TABLE 4

| Sample* | Processing Index, kP | Dynatup Impact, lbs. | Bruceton Frozen Drop, ft. | Tensile Yield, psi | Topload, psi | Part Density, g/cc | Flexural Modulus, psi |
|---|---|---|---|---|---|---|---|
| Comp. 33a | 0.25 | 39 | 5.15 | 2,670 | 123 | 0.9407 | 206,440 |
| Comp. 33b | 0.25 | 37 | ND | 2,690 | 121 | 0.9415 | 216,700 |
| Ex. 34 | 0.18 | 54 | 5.05 | 2,640 | 134 | 0.9443 | 222,000 |
| Ex. 35 | 0.29 | 69 | 6.75 | 2,540 | 110 | 0.9378 | 152,000 |
| Ex. 36 | 0.26 | 50 | 6.00 | 2,900 | 120 | 0.9433 | 201,380 |
| Ex. 37 | 0.21 | 58 | 5.63 | 2,750 | 124 | 0.9424 | 190,000 |
| Comp. 38 | 0.37 | 60 | 8.58 | 2,795 | 123 | 0.9412 | 190,000 |
| Comp. 39 | 0.30 | 62 | 6.42 | 2,700 | 125 | 0.9425 | 187,000 |

*Comparative Runs 33a and 33b are unmodified high flow injection molding resins having $I_2$ melt indexes of about 60 g/10 minutes, densities of about 0.952 g/cc and are supplied commercially by The Dow Chemical Company under the designation IP-60.
Example 34 is a polymer mixture having a final $I_2$ melt index of 55 g/10 minutes that was manufactured with a two reactor configuration where the first reactor produced 15 weight percent of the total polymer using a constrained geometry catalyst and the fraction had a 4 $I_2$ melt index and a 0.917 g/cc density and the second reactor produced 85 weight percent of the total polymer using a conventional high efficiency Ziegler catalyst system.
Example 35 is a polymer mixture having a final $I_2$ melt index of 55 g/10 minutes that was prepared by dry tumble blending 15 weight percent of a substantially linear ethylene polymer manufactured with a constrained geometry catalyst system and having an $I_2$ melt index of 30 g/10 minutes and a density of 0.902 g/cc with 85 weight percent of ethylene polymer having an $I_2$ melt index of 60 g/10 minutes and a density of 0.956 g/cc.
Example 36 is a polymer mixture having a final $I_2$ melt index of 58 g/10 minutes that was prepared by melt compounding on a 8 inch, 20:1 L/D Farrel extruder equipped with 215 psi steam 10 weight percent of a substantially linear ethylene polymer manufactured with a constrained geometry catalyst system and having an $I_2$ melt index of 30 g/10 minutes and a density of 0.902 g/cc with 90 weight percent of ethylene polymer having an $I_2$ melt index of 60 g/10 minutes and a density of 0.956 g/cc.
Example 37 is a polymer mixture having a final $I_2$ melt index of 36 g/10 minutes and a relatively broad molecular weight distribution (MWD) that was manufactured with a two reactor configuration where the first reactor produced 15 weight percent of the total polymer using a constrained geometry catalyst and the fraction had a 4 $I_2$ melt index and a 0.917 g/cc density and the second reactor produced 85 weight percent of the total polymer using a conventional high efficiency Ziegler catalyst system.
Comparative Run 38 is an unmodified high flow injection molding resins having an $I_2$ melt index of about 40 g/10 minutes, density of about 0.952 g/cc and is supplied commercially by The Dow Chemical Company under the designation IP-40.
Comparative Run 39 is an unmodified high density polyethylene resins having an $I_2$ melt index of about 65 g/10 minutes, density of about 0.953 g/cc and is supplied commercially by The Dow Chemical Company under the designation HDPE 65053N.

What is claimed is:

1. A high flow, thinwall polymer composition characterized as having a rheology wherein the composition is thermoformable and moldable at a flow length to wall thickness ratio of equal to or greater than 250:1, comprising or made from
   A) from about 75 to about 99 weight percent, based on the total weight of the composition, of at least one polyolefin selected from the group consisting of polypropylene, high density polyethylene, medium density polyethylene, and linear low density polyethylene, wherein the polymers of the group are characterized as having a processing index of less than or equal to about 0.6 kpoise under loads of 500 to 5250 psig nitrogen pressure at 190° C. as measured using a gas extrusion rheometer which has a 0.0296 inch diameter and a 20:1 L/D die with a 180° entrance angle, and ethylene polymers of the group are characterized as having:
      i. an $I_1/I_2$ of at least 7.0, and
      ii. a density in the range of from about 0.92 grams/cubic centimeter to about 0.96 grams/cubic centimeter, and
   B) from about 1 to about 25 weight percent, based on the total weight of the composition, of at least one substantially linear ethylene/α-olefin polymer characterized as having
      i. a short chain branching distribution index (SCBDI) greater than about 30 percent, and
      ii. a single melting point as determined using differential scanning calorimetry (DSC),
      iii. a melt flow ratio, $I_{10}/I_2$, $\geq 5.63$,
      iv. a molecular weight distribution, $M_w/M_n$, defined by the equation:

$$M_w/M_n < (I_{10}/I_2) - 4.63,$$

v. a critical shear rate at onset of surface melt fracture of at least 50 percent greater than the critical shear rate at the onset of surface melt fracture of a linear olefin polymer having essentially the same $I_2$ and $M_w/M_n$, and
      vi. a density in the range of from about 0.85 grams/cubic centimeter to about 0.91 grams/cubic centimeter.

2. A high flow, thinwall polymer composition characterized as having a rheology wherein the composition is moldable at a flow length to wall thickness ratio of equal to or greater than 250:1, comprising or made from
   A) from about 75 to about 99 weight percent, based on the total weight of the composition, of at least one polyolefin selected from the group consisting of high density polyethylene, medium density polyethylene, and linear low density polyethylene, wherein all polymers of the group are characterized as having
      i. a processing index of less than or equal to about 0.6 kpoise under loads of 500 to 5250 psig nitrogen pressure at 190° C. as measured using a gas extrusion rheometer which has a 0.0296 inch diameter and a 20:1 L/D die with a 180° entrance angle,
      ii. an $I_{10}/I_2$ of at least 7.0, and iii. a density in the range of from about 0.92 grams/cubic centimeter to about 0.96 grams/cubic centimeter, and B) from about 1 to about 25 weight percent, based on the total weight of the composition, of at least one substantially linear ethylene/α-olefin polymer characterized as having:
  i. a short chain branching distribution index (SCBDI) greater than about 30 percent, and
  ii. a single melting point as determined using differential scanning calorimetry (DSC),
  iii. a melt flow ratio, $I_{10}/I_2$, $\geq 5.63$,
  iv. a molecular weight distribution, Mw/Mn, defined by the equation:

$$M_w/M_n \leq (I_{10}/I_2) - 4.63,$$

v. a critical shear rate at onset of surface melt fracture of at least 50 percent greater than the critical shear rate at the onset of surface melt fracture of a linear olefin polymer having essentially the same $I_2$ and $M_w/M_n$, and
  vi. a density in the range of from about 0.85 grams/cubic centimeter to about 0.91 grams/cubic centimeter.

3. The composition of claims 1 or 2 wherein the $I_{10}/I_2$ of Component (B) is at least about 7.

4. The composition of claims 1 or 2 wherein the $I_{10}/I_2$ of Component (B) is at least about 8.

5. The composition of claims 1 or 2 wherein Component (B) is a copolymer of ethylene and at least one $C_3$–$C_{20}$ α-olefin.

6. The composition of claims 1 or 2 wherein of Component (B) is a copolymer of ethylene and 1-ocetene.

7. The composition of claims 1 or 2 wherein the substantially linear ethylene/α-olefin polymer has from about 0.01 to about 3 long chain branches/1000 carbons along the polymer backbone.

8. The composition of claims 1 or 2 wherein the α-olefin is $C_4$–$C_6$.

9. The composition of claims 1 or 2 wherein the composition is further characterized as having a Dynatup Impact Energy value at 23° C. (75° F.) at least about 25 percent higher than the at least one polyolefin Component (A) and a topload strength retention value at least about 85 percent relative to the at least one polyolefin Component (A).

10. The composition of claims 1 or 2 wherein the at least one polyolefin is a high density polyethylene homopolymer having an $I_{10}/I_2$ of at least about 7.5 and a molecular weight distribution as determined by gel permeation chromatography (GPC) of at least about 3.

11. A fabricated article made from the composition of claims 1 or 2.

12. A fabricated article made from the composition of claims 1 or 3.

13. The fabricated article of claim 12, manufactured by an injection molding process.

14. The fabricated article of claim 12, wherein the article has a flow length to wall thickness of at least about 250:1.

* * * * *